PISTON RING ELEMENTS

Filed Aug. 8, 1956 4 Sheets-Sheet 1

INVENTOR:
GEORGE C. MAYFIELD
By Bruninga and Sutherland
ATTORNEYS.

Oct. 29, 1957 G. C. MAYFIELD 2,811,399

PISTON RING ELEMENTS

Filed Aug. 8, 1956 4 Sheets-Sheet 2

INVENTOR:
GEORGE C. MAYFIELD
By Brumbaugh and Sutherland
ATTORNEYS.

Oct. 29, 1957 G. C. MAYFIELD 2,811,399

PISTON RING ELEMENTS

Filed Aug. 8, 1956 4 Sheets-Sheet 3

INVENTOR:
GEORGE C. MAYFIELD
BY Brininger and Sutherland
ATTORNEYS.

INVENTOR:
GEORGE C. MAYFIELD
By Brewninga and Sutherland
ATTORNEYS.

United States Patent Office 2,811,399

Patented Oct. 29, 1957

2,811,399

PISTON RING ELEMENTS

George C. Mayfield, Richmond Heights, Mo., assignor to McQuay-Norris Manufacturing Company, St. Louis, Mo., a corporation of Delaware Application August 8, 1956, Serial No. 603,469

8 Claims. (Cl. 309—44)

This invention relates generally to piston rings and expanders of the non-bottoming type for use in internal combustion engines. This application is a continuation-in-part of my copending application Serial No. 374,480, filed August 17, 1953, now abandoned.

In my Patent No. 2,486,359, I point out the undesirability, in rings of this sort, of having a succession of sections, each separated from its neighbor by a gap which renders the cylinder-engaging edge of the ring discontinuous. In that patent, I disclosed a ring wherein the cylinder-engaging edge was continuous (save at the abutting ends) and in which circumferential expansion and contraction was made possible through the yielding of thin integral bridges located at the cylinder-engaging edge and adapted to flex. In order to achieve the desired flexibility in such flexible bridging webs, one dimension of their cross-section must be made quite thin and yet thick enough to withstand wear over a relatively long period of time. In order to achieve the optimum results with piston rings of this character, a high order of precision is essential in order to prevent the bridging web from being either too thick or too thin for the purpose.

It is an object of the present invention, therefore, to provide a non-bottoming type of piston ring element, in which the undesirable effect of interruptions in the cylinder-engaging edge is eliminated, but which does not require the close precision of manufacture required by the rings of my aforesaid patent and in which the vibration difficulties of edge-notched rings are minimized.

In non-bottoming piston rings wherein upper and lower cylinder-engaging edges have been provided with notches extending inwardly from such edges, it has heretofore been proposed to stagger such notches and to squeeze the upper and lower edges together so that the segment defined between two notches in one edge member bridges the gap formed by a notch in the other edge member. While such structures close the gaps which would otherwise exist at the notches, they inherently necessitate the provision of considerably more side clearance than is usual or desirable, as otherwise such rings will bind in the groove. The latter condition is ascribable to the fact that, upon application of circumferential load, buckling occurs at the inner periphery of such rings and tends to open the fold. Accordingly, it is a further object of the invention to provide a piston ring element of the aforesaid type with substantially spaced relatively thin edges.

In various non-bottoming types of piston ring elements wherein the interruptions in the peripheral edges are in staggered relation, I have observed serious vibration tendencies which, at resonant frequency, cause surging. This leads not only to poor performance, but may result in breakage. Accordingly, another object of my invention is to provide a ring element of the character aforesaid, in which the vibration and surging tendencies are eliminated or minimized.

It has also been my observation that, when piston ring elements of the non-bottoming edge-notched type fail in operation, such failure occurs very near the abutting ends of the ring. Still another object of my invention is, therefore, to provide a ring element of the character aforesaid wherein the proclivity to fail in the endmost sections is reduced. In pursuit of this objective, I have photoelastically investigated the stress concentrations in plastic models of such rings as heretofore provided and found, to my surprise, that the stress is actually higher in the sections adjacent the abutting ends of such rings than in sections remote from the abutting ends.

In accordance with the present invention, a non-bottoming type of piston ring element, the essential features of which are adaptable both to cylinder-engaging rings and to expanders for other cylinder-engaging rings, is preferably formed as an open channel whereby to provide substantially spaced lands which are spaced apart by looped flexible elements, the free ends of which overlie or underlie the aforesaid lands and are located so as to constitute bridges across the interruptions in said lands, thereby effectively arresting vibration of land sections adjacent the interruptions and, where the piston ring element is used as a cylinder-engaging ring effectively closing such interruptions against the passage of oil and gases.

The invention further contemplates that in ring elements of the non-bottoming type wherein the multiplicity of circumferentially relatively movable segments are flexibly interconnected, the flexibility of the interconnections be made to vary so that, at positions near the abutting ends, the flexibility will be less than the flexibility remote from such ends.

Other objects will become apparent to those skilled in the art when the following description is read in connection with the accompanying drawings, in which.

In the accompanying drawings, the several embodiments are illustrated in forms appropriate for use as cylinder-engaging rings, but it is to be understood that the structures are also useful as spacers between cylinder-engaging rings of other types, and also as expanders for such other types of rings. Where used as a combination spacer-expander, the several illustrated ring structures are preferably provided with radial-thrust-transmitting parts for engagement with the other rings which may be disposed in the same piston ring groove above and/or below the structures shown, all as taught in my copending application Serial No. 602,736, filed of even date herewith.

Figure 1:
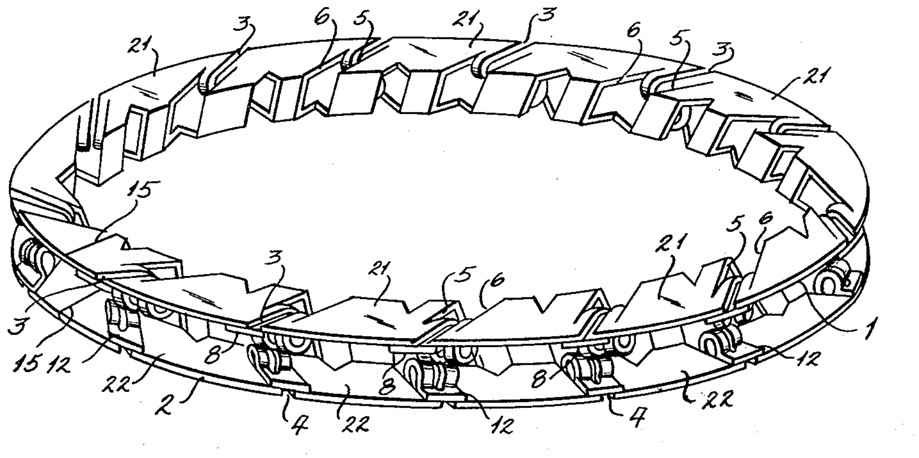
Figure 1 is a perspective view of a piston ring element constructed in accordance with the present invention.

Referring now to Figures 1 to 5, inclusive, of the drawings, there is shown in Figure 1 a non-bottoming channel-shaped piston ring element comprising a pair of lands having free edges 1 and 2. The ring element is formed from a blank strip of sheet metal (Figure 5), punched out to provide a succession of notches 3 extending inwardly from and oblique to edge 1 thereof, and an opposite set of notches 4 extending obliquely inwardly from the other edge 2 thereof. In the embodiment shown in Figures 1 through 5, the several notches 3 and 4 are symmetrically arranged, and terminate substantially beyond the center line of the strip. Embracing each of the notches 3 but spaced therefrom is a U-shaped incision having legs 5 and 6 and a base 7 defining a cantilever member 8 which is U-shaped. Similar incisions 9, 10 and 11 embrace opposite notches 4 and define similar cantilever members 12. Each cantilever member is thus integral with the balance of the ring adjacent the edge thereof, from which extends the notch embraced by it.

Figure 3:
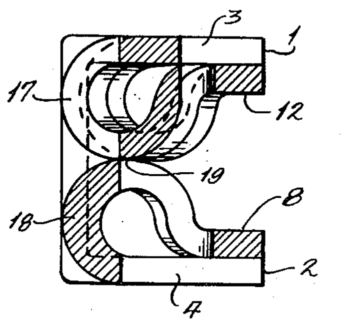
Figure 3 is a sectional view taken along line 3—3 of Figure 2.
Figure 4:
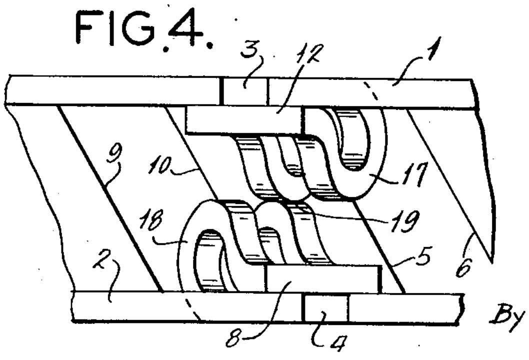
Figure 4 is a view in exterior side elevation of a portion of the ring element shown in Figure 1.
Figure 7:
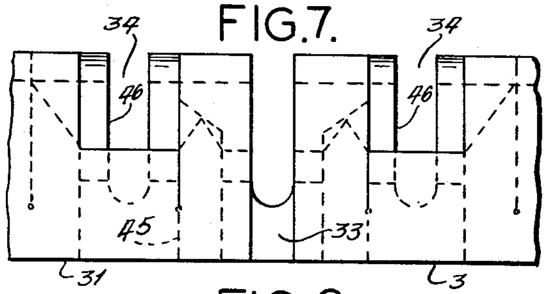
Figure 7 is a plan view of a section of the ring element resulting from the blank shown in Figure 6.

Having punched out and cut the strip in the manner described, the respective cantilever members are curled in the manner shown in Figure 3, and the blank is folded into a U-shaped channel by right angular folds along lines 13 and 14, thereby providing an upper land between the fold 13 and the edge 1; and a lower land between the fold 14 and the edge 2. The U-shaped channel is then formed into a ring with its opposite ends brought into abutting engagement at 15 and with the channel opening outwardly as shown in Figure 1.

The cantilever members 8 and 12 may be curled as above described either before or after the strip is folded into the open channel shape. In either event they are preferably so curled that the ends defined by cuts 7 and 11 are brought into alignment with the edges 1 and 2 of the ring, and in bridging relationship with the notches 3 and 4 at said edges. In so bending the cantilever members 8 and 12, the loops 17 and 18 thereof are preferably so proportioned as to make surface engagement with each other as at 19. The latter provides a spacing support between the upper and lower lands in the axial direction, and also dampens vibration.

In this embodiment, the lands are subdivided into segments 21 and 22 respectively. Adjacent segments 21 in the upper land are connected together (across notches 3) by the cantilever members 8 which approach the effect of a coil spring extending from end to end of the ring. Cantilever members 12 similarly connect adjacent segments 22 in the lower land.

Figure 5:
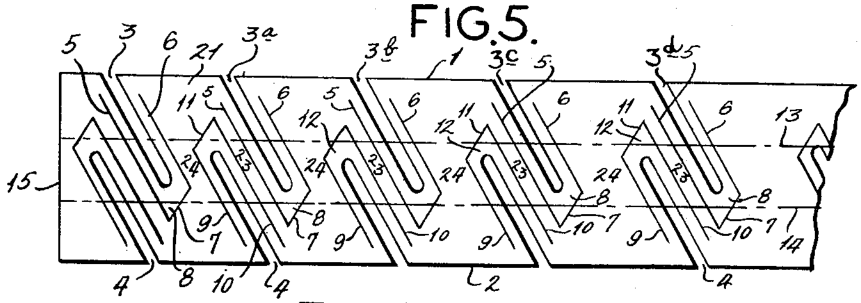
Figure 5 is a plan view of an end portion of a sheet metal blank notched and incised, ready to be folded into the channel shape of the final ring element shown in Figure 1.
Figure 2:
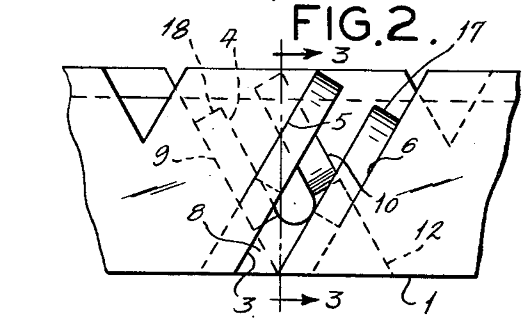
Figure 2 is an enlarged plan view of a portion of the ring element shown in Figure 1.

Adjacent segments 21 are also interconnected through struts 23 and 24, which extend to segments 22 at the opposite edge. Strut 23 is the band of metal which extends between cut line 10 and cut line 5. Strut 24 is a similar band of metal which extends between cut line 6 and cut line 9. These struts are situated on opposite sides of cantilever member 8, the one 24 on the right and the other 23 on the left, as shown in Figure 5. When the ring element is circumferentially compressed, these struts are in flexure and the flexibility of the ring is thus governed by the stiffness of these struts as well as by the stiffness of the spring action exerted by the looped cantilever members.

In the embodiment shown, the notches 3 and 4 are not uniformly spaced, but it will be understood that, if desired, they can be uniformly spaced. Uniform spacing of the notches, other factors and dimensions likewise being maintained uniform, results in greater concentration of stress in the struts located within approximately one radian of the abutting ends 15 than in the struts more remote therefrom. This makes the ring element bear more heavily against the cylinder or against other rings which engage the cylinder (depending upon whether the ring element is used as a cylinder-engaging ring or as an expander for other cylinder-engaging rings) in the regions adjacent the abutting ends than in regions toward the heel of the ring element.

Concentration of stress in the struts near the abutting ends 15 may be overcome by making one or more of the interconnections between successive segments less flexible toward the abutting ends than in the intermediate zone of the ring. In the embodiment of Figures 1–5, this is accomplished by progressively reducing the circumferential dimension of struts 24 in the endward regions, thereby varying the center to center distance between successive notches 3 and between successive notches 4. Referring to notches 3, for example, if the center to center distance between notch 3 (nearest end 15) and the next notch $3^a$ is D; the distance between notch $3^a$ and the next notch $3^b$ is D plus an increment C; the distance between notch $3^b$ and notch $3^c$ is D+2C; between notch $3^c$ and notch $3^d$ it is D+3C, etc., for about a radian, and therebeyond the notches may be uniformly spaced. As shown, the dimension of strut 23 remains constant in order to assure that the cantilever members 8 and 12 will abut when looped. The dimension of cantilever members 8 and 12 are shown as constant throughout; but it will be understood that variation therein may also be made to progressively change the flexibility of the interconnection between successive segments 21 and 22 and thereby improve the circumferential uniformity of pressure upon the cylinder wall. Other ways of accomplishing this result are hereinafter disclosed in connection with a further embodiment, but are equally applicable to this embodiment.

Referring now to Figures 6 to 9 inclusive for another embodiment, a channel-type, non-bottom ring element is shown wherein an upper land has a cylinder-bearing edge 31 and a lower land has a cylinder-bearing edge 32. This ring element is formed from a blank, the opposite edges of which are provided with a series of notches 33 and 34. In spaced relationship about edge notch 33 are cut lines 35, 36, 37, 38, 39, 40 and 41 which define a cantilever member 42. Between the cut lines 39, 40 and 41 of one cantilever member 42 and the cut lines 35, 36, and 37 of the cantilever member 42 about the next slot 33 there is defined by the same cut lines a similarly shaped oppositely disposed cantilever member 43 about notch 34.

Figure 9:
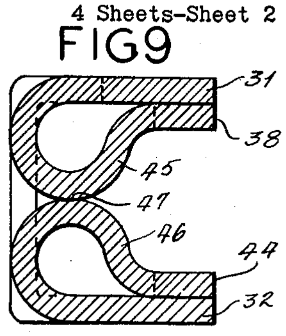
Figure 9 is a sectional view taken along line 9—9 of Figure 8.

The cantilever members 42 and 43 are curled as in the previous embodiment and the blank is formed into a channel, as before, to produce a ring element whose cross-section is illustrated in Figure 9.

The curling of the cantilever members is accomplished in such manner that the end of member 42 defined by cut line 38 is moved into alignment with edge 31 and across the mouth of notch 33 embraced by that cantilever member. Similarly cantilever member 43 is curled in such manner that its free end 44 becomes aligned with edge 32 across the mouth of notch 34 embraced by that cantilever member. In so curling the cantilever members, loops 45 and 46 are formed of such dimensions that they preferably engage each other at 47 thereby spacing the lands and dampening vibration.

In this embodiment, the cantilever members are cut out in groups of three consisting of two about notches extending from one of the edges and the other about a notch extending from the opposite edge. The respective groups are alternately arranged and between groups there remains a band of metal 46 and 47. Within a group of three cantilever members, however, no interconnecting strut or band extends between the opposite edges 31 and 32 except as provided by the curled cantilever members. The bands 46 and 47 function primarily to prevent separation of the upper land from the lower land and the flexibility of the ring element is thus dependent in this instance primarily upon the flexibility of the cantilever members alone. The flexibility of bands 46 and 47 is, however, a sufficient determinant of flexibility of the ring, that variation in the dimension of those bands may be relied upon to make the ring element less flexible in its end-most increments than in its intermediate increments. For example, band 47 is of greater dimension (lengthwise of the blank) than band 46 and of lesser dimension than band 48.

Figure 8:
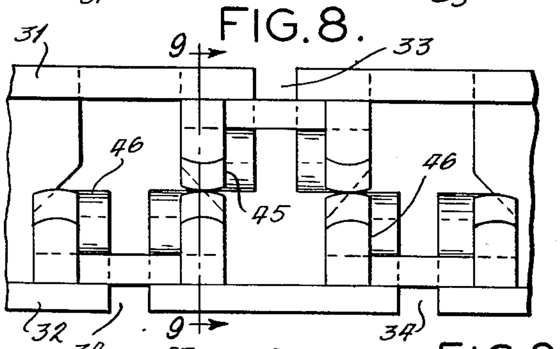
Figure 8 is a front elevation of the ring element shown in Figure 7.

The lesser dimension of the cantilever members 42 and 43 at their free ends 38 and 44, respectively, than at their opposite ends provides for overlapping of the loops formed by the center one in any group of three upon the loops formed by the outer ones in any group of three as clearly shown in Figure 8.

Referring now to Figures 10, 11, 12, and 13 for a further embodiment in which the ring element is intended to be of such axial dimension that two of them may be accommodated in a single piston groove. In this embodiment, the ring element is formed from a blank shown in Figure 13 having opposite edges 51 and 52. A series of notches 53 extend inwardly from edge 51, and a series of notches 54 extend inwardly from edge 52. About each of the notches 53 cut lines 55, 56, and 57 extend defining a cantilever member 58. Similarly, about each of the notches 54 cut lines 59, 60 and 61 extend defining cantilever member 62 in the same manner as above described with respect to the embodiments shown in Figures 1 through 5, inclusive, except that in this instance, the notches extend perpendicular to the edges of the blank.

Figure 10:
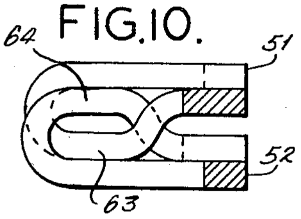
Figure 10 is a sectional view (taken along line 10—10 of Figure 12) of a further embodiment of a ring element constructed in accordance with the present invention.
Figure 6:
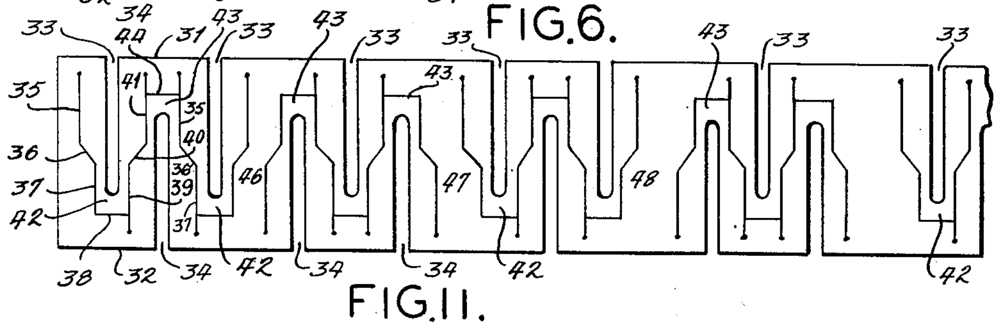
Figure 6 is a plan view of the end portion of a blank from which a further embodiment of the ring element may be made.
Figure 11:
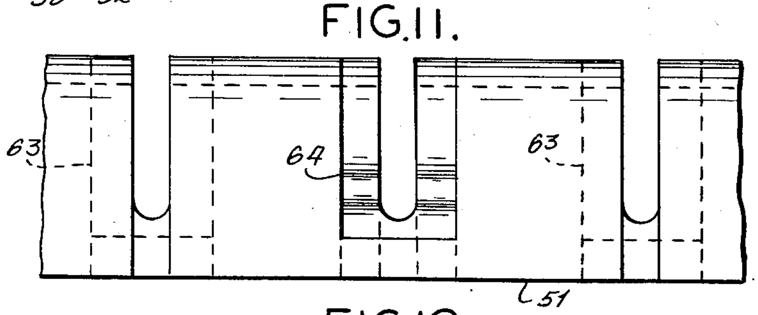
Figure 11 is a plan view of the ring element shown in Figure 10.
Figure 12:
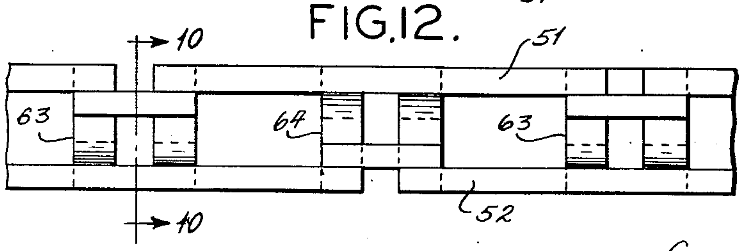
Figure 12 is a view in front elevation of the ring element shown in Figures 10 and 11.
Figure 13:
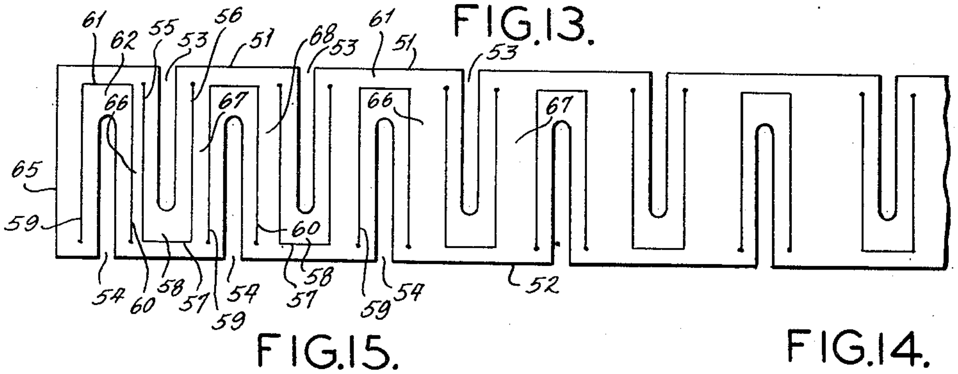
Figure 13 is a plan view of the end portion of a blank from which the ring element shown in Figures 10, 11 and 12 is made.
Figure 15:
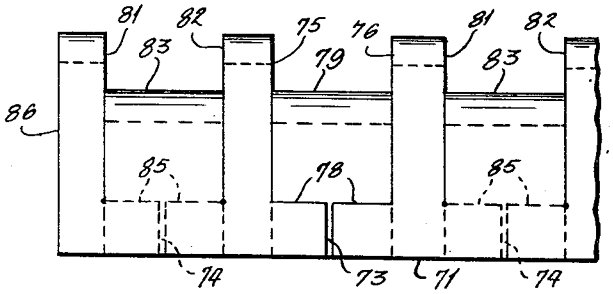
Figure 15 is a plan view of the ring element shown in Figure 14.

The several cantilever members are curled to bring them into the relationship shown in Figure 10 and in a manner similar to that described above in connection with the first embodiment, with this exception, however, the cantilever members 58 and 62 are curled in such manner that the loops 63 and 64 thereof have an axial dimension corresponding to the distance between the upper and lower lands.

In this embodiment also, the center-to-center spacing between the several notches progressively increases away from end 65 so that the width of strut 66 is less than that of strut 67, and the latter less than that of strut 68, etc., for about a radian from the end 65.

Figures 16, 17:
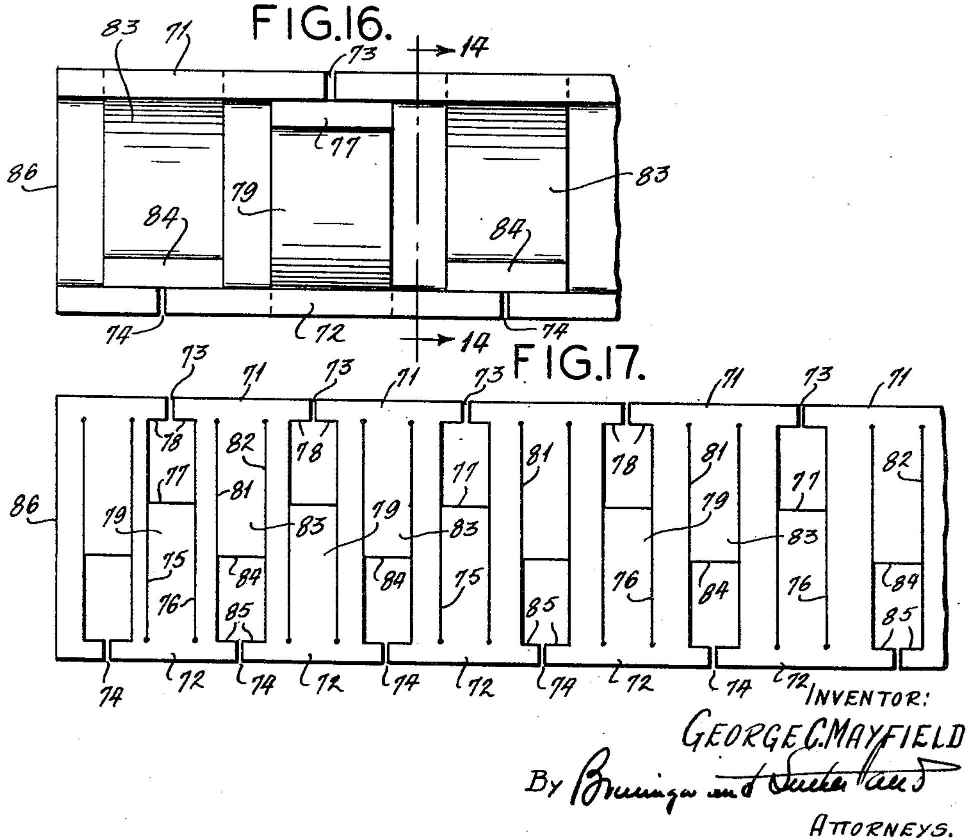
Figure 16 is a view in front elevation of a section of the ring element shown in Figures 14 and 15.
Figure 17 is a plan view of the end portion of a blank from which the ring element shown in Figures 14, 15 and 16 may be made.

Referring now to Figures 14–17, inclusive, for a further embodiment of the invention, the ring element, as in the previous embodiments, is a channel-type non-bottoming ring element having upper and lower lands whose edges 71 and 72 engage the cylinder. The blank from which the ring element is formed is shown in Figure 17 and is provided with a series of notches 73 extending inwardly from edge 71 as well as a series of notches 74 extending inwardly from edge 72. This embodiment differs from those previously described primarily in that the notches do not extend into the cantilever members.

The cantilever members in this instance are formed by a pair of cut lines 75 and 76 extending parallel to the center line of each notch 73 and equally spaced therefrom on opposite sides of said center line. Other cut lines 77 and 78 define the boundaries of a hole between the free end (defined by line 77) of cantilever member 79 and the inner end of notch 73. In one sense the hole between lines 77 and 78 may be considered as an enlarged extension of notch 73. Similarly cut lines 81 and 82 are arranged on opposite sides and in equally spaced relationship from the center line of notch 74 thereby defining a cantilever member 83 which terminates at cut line 84. As above-described, in connection with the oppositely addressed notches an opening is left between cut line 84 and cut line 85.

Figure 14:
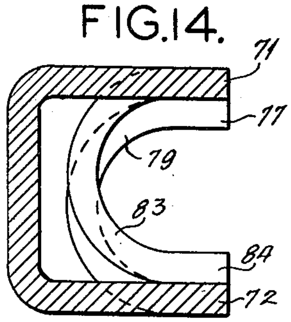
Figure 14 is a sectional view of a ring element constituting a further embodiment of the invention said section being taken along line 14—14 of Figure 16.

The cantilever members are curled as shown in Figure 14 so that cantilever member 79, which springs from the lower land of the ring element, has its end 77 aligned with edge 71 in bridging relationship to notch 73. Similarly cantilever member 83 which springs from the upper land has its end 84 brought into alignment with edge 72 in bridging relationship to notch 74.

The bowed cantilever members, therefore, close off the passage provided by the notches adjacent the cylinder-engaging edges and also serve to space the upper and lower lands from each other as well as dampening vibration.

As in the previous embodiments the distance between notches 73, which are nearest end 86 of the ring element, is shorter than the distance between such notches more remote from the end. Likewise, the distance between notches 74 progressively increases from a minimum spacing near end 86 to a standard spacing about a radian from such end.

In the embodiments above-described, the several ring elements are made less flexible (under circumferential compression), in the increments thereof nearest the end abutment, than in the intermediate increments, by varying the pitch between the several notches. The same result may be accomplished in innumerable other ways with or without varying the pitch between notches. For example, referring to the blank shown in Figure 13, and assuming that the notches 53 and 54 are equally spaced (center-to-center) throughout the circumference of the ring element, the increments thereof near the abutting ends 65 may be made less flexible by changing the relative positions of cut-lines 55, 56, 59, and 60, so that the struts 66 and 67 become progressively narrower as the end 65 is approached. Such variation of the position of cut-lines 55, 56, 59, and 60 concomitantly varies the dimension (lengthwise of the blank) of the cantilever members 58 and 62, but by coordinating the stiffness incident to increasing the width of struts 66 and 67 with the added flexibility which results from decreasing the width of the cantilever members 58 and 62, the desired additional stiffness near the ends of the ring element can be achieved.

Another way in which to increase the stiffness of the ring element in the endward increments is to change the distance between edge 51 and the adjacent termini of cut-lines 55 and 56. The greater this distance, the stiffer the ring element in that increment. Accordingly, toward the ends of the ring element, cut-lines 55 and 56 may terminate farther from edge 51, and cut-lines 59 and 60 may terminate farther from edge 52, than the corresponding cut-lines in the intermediate regions of the ring element.

Still another way of accomplishing decreased flexibility in the endward increments is to move cut-line 57 farther from edge 52, and to move cut-line 61 farther from edge 51, thus foreshortening the cantilever members 58 and 62, respectively, and leaving more material between the aforementioned cut-lines and the proximate edges of the ring element in the regions toward the ends than in the regions therebetween.

The stiffness of the ring element in the endward increments may also be increased by varying the depth (widthwise of the blank) of the notches 53 and 54.

Still another way of increasing the stiffness in the endward increments is to vary the width (lengthwise of the blank) of the notches 53 and 54 by making them narrower in the endward increments than in the intermediate increments.

The same may be achieved in various other ways too numerous to mention, including varying the thickness of the stock in the endmost increments; providing reinforcement flutes in the struts at the endmost increments; differential hardening or tempering of the endmost increments; or work-hardening as by shot-basting the endmost increments, all according to techniques well known in the art, and applied in a manner such as to make the endward increments of the ring element less flexible (in circumferential compression) than the intermediate increments.

Thus, in a great variety of ways, the invention contemplates that in the regions near the abutting ends of the ring elements there be some variation, preferably progressive, of the dimensions or other physical properties of the sub-parts whereby to make the ring element less flexible near the abutting ends than in the intermediate regions. This same concept is likewise applicable to non-bottoming ring elements of the zig-zag folded type as illustrated in Figures 18 and 19.

Figure 18:
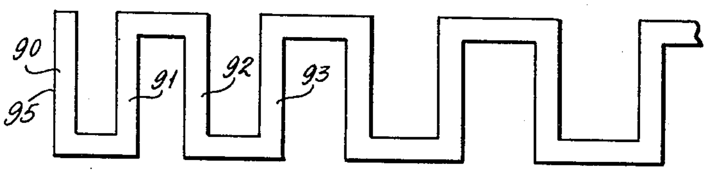
Figure 18 is a view in front elevation of the abutting ends of a zig-zag folded type of non-bottoming ring or expander wherein stress concentration, in the endward regions, is reduced by varying the pitch between folds.

In Figure 18 the pitch between folds 90 and 91 is less than the pitch between folds 91 and 92 and the latter is less than the pitch between folds 92 and 93, etc., for about a radian from the end abutment 95 in each direction, but in the intermediate region the pitch between corresponding folds may be standard and greater than that between the endmost folds.

Figure 19:
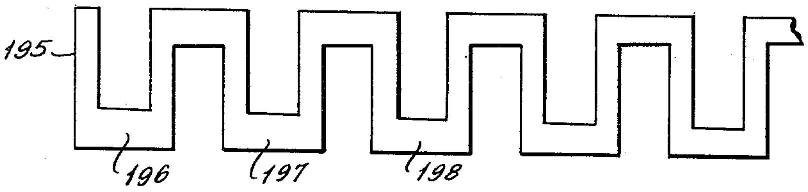
Figure 19 is a view in front elevation of the abutting ends of a zig-zag folded type of non-bottoming ring or expander wherein stress concentration, in the endward regions, is reduced by varying the pitch between folds accomplished at uniform fold pitch.

In Figure 19 the pitch between successive folds of a zig-zag folded ring element is constant from end to end but in the folds which are nearest the end abutment 195 the thickness of the bridge section 196 is greater than the thickness of the next bridge section 197 and the latter is greater than the thickness of the next succeeding bridge section 198. The thickness of the bridge sections at the opposite side of the ring element likewise progressively increases toward the end abutment 195.

The progressive diminution of flexibility in the endward increments has the further beneficial effect of preventing vibration waves or surges from traveling circumferentially about the ring element and across the abutting ends thereof. Since the relatively flexible cylinder-engaging segments are progressively less flexible as the abutting end is approached, their resonant frequency is different from each other and different from that of the intermediate segments. Thus a surge originating in the intermediate region (where the segments have the same resonant frequency) is suppressed when it reaches the endmost regions and cannot be propagated round and round.

Another way of suppressing the transmission of surges across the abutted ends of a ring, and also dampening vibration, is to form the opposite abutting ends so that the outer increments of the ring are flexed more or less than the inner increments thereof when the ring is contracted from its free and unconfined condition to the diameter of the cylinder bore with which it operates. Depending upon their particular structure, some non-bottoming rings are more flexible under circumferential compression at their backs than at their cylinder-engaging faces, while others are more flexible at their cylinder-engaging faces than at their backs. It is preferable that abutment between the opposite ends occur first at that side of the abutting ends, which is most flexible under circumferential compression. For example, rings of the character shown in Figures 1–5, 6–10, and 11–13 are more flexible at their backs than at their cylinder-engaging faces, so that in such cases the abutting ends of the ring are preferably so formed that the ends engage at the back before they engage at the cylinder-engaging face. On the other hand, rings of the character represented by Figures 14–17 are more flexible at their cylinder-engaging faces than at their backs, and in such cases, it is preferable that engagement at the abutting ends occur first at the outer or cylinder-engaging face.

Figure 20:
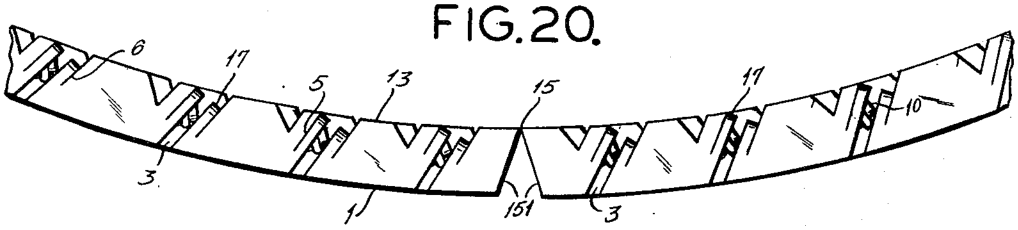
Figure 20 is a plan view of the abutting ends of a modified form of the ring element shown in Figures 1–5 in its free and unconfined condition.

Figure 20 represents (in its free and unconfined condition) a modification of the ring shown in Figures 1–5 embodying the last-mentioned modification. As shown, the corners at the end 15 are cut back outwardly of fold lines 13 and 14 at an angle of between 15 and 20 degrees. Thus, the upper and lower lands terminate endwise in oblique lines 151 which, when the ring is in its free and unconfined condition, make an angle with each other of about 35 degrees. As circumferential compression is applied to such a ring, the angle between the two lines 151 is gradually reduced until endwise abutment is made at the exterior increments of the upper and lower lands. Prior to the time abutment is made at such exterior increments, the circumferential contraction is absorbed almost entirely by flexure of the struts 23 and 24, but once abutment has occurred at the outer extremities of lines 151, further contraction results in flexing the cantilever members 8 and 12. Thus, when in its operating condition, the struts 23 and 24 are under greater stress than the cantilever members 8 and 12, and this differential in stress has the result of giving the interconnections at the back a different resonant frequency from the interconnections at the front of the ring, thereby dampening vibration.

Figure 21:
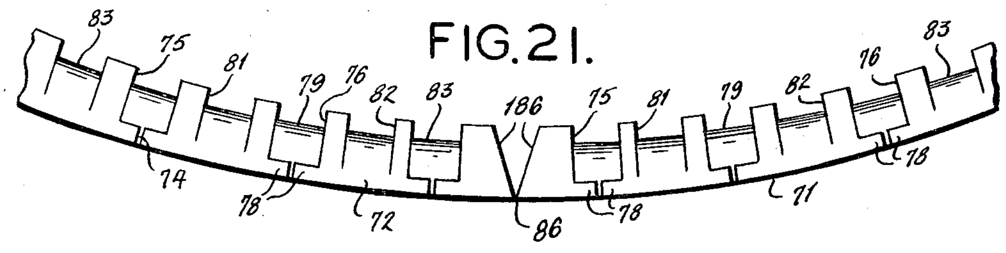
Figure 21 is a plan view of the abutting ends of a modified form of the ring element shown in Figures 14–17 in its free and unconfined condition.

Figure 21 represents (in its free and unconfined condition) a ring of the type shown in Figures 14–17, inclusive, which is inherently more flexible at the cylinder-engaging face than at the back; and accordingly, the abutting ends are operated upon so as to make initial abutment at the cylinder-engaging face. In this instance, the blank is angled back in the opposite direction to that described above in connection with Figure 20, so that the cylinder-engaging edges are, in fact, longer than the back of the ring. The interior parts of the end 86 are thus cut back so as to terminate in oblique lines 861, which together form an angle of about 35 degrees when the ring is in its free and unconfined condition. While, in this embodiment, circumferential contraction of the ring results first in flexing the outer increments of the ring and finally in flexing the inner increments, a comparable differential in stress to that explained above in connection with Figure 20 is set up with the resultant dampening of vibration.

Suitable expedients for maintaining the abutting ends of the ring element in alignment may be employed when and if desired in connection with any of the embodiments described.

From the foregoing description, it is apparent that those skilled in the art will understand the structure, function and mode of operation of the invention herein disclosed, appreciate the advantages thereof, and realize that it accomplishes its objects. Although several embodiments have been disclosed in detail, it is to be understood that the invention is not limited thereto, but the drawings and description thereof are to be understood as being merely illustrative. For example, features disclosed in certain of the embodiments may be incorporated in other embodiments. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In a piston ring element of the non-bottoming type having an outer periphery and an inner periphery both of which are flexible under circumferential compression, the improvement which comprises, the abutting ends of said ring being oblique to a radius thereof when free and unconfined to provide a free gap at one periphery when the ends abut at the other periphery.

2. The improvement of claim 1 wherein the respective peripheries differ in degree of flexibility and the free gap is at the less flexible periphery.

3. The improvement of claim 1 wherein the increments of said ring element adjacent said abutting ends are less flexible than the increments remote from such abutting ends.

4. A non-bottoming piston ring element comprising a channel having its edges interrupted by notches extending inward from such edges, incisions embracing the bight of said notches, said incisions terminating short of the edges of said channel, said incisions and said notch defining a generally U-shaped cantilever member disconnected from the channel save at the open ends of the legs thereof, and said notches and incisions being differently proportioned adjacent the ends of said channel than in another increment thereof.

5. A non-bottoming piston ring element comprising a channel having its edges interrupted by notches extending inward from such edges, incisions embracing the bight of said notches, said incisions terminating short of the edges of said channel, said incision and said notch defining a generally U-shaped cantilever member disconnected from the channel save at the open ends of the legs thereof, and said channel being progressively more flexible from the ends thereof toward the intermediate section.

6. In a piston ring element of the non-bottoming type having ends arranged to abut when in operative position and having between such ends a multiplicity of sections which are flexibly interconnected for relative circumferential movement, the improvement which comprises, said ring element being less flexible at sections adjacent the abutting ends thereof than at sections intermediate said ends.

7. In a piston ring of the non-bottoming type having a plurality of cylinder-engaging segments separated by edge notches and circumferentially flexible connections between said segments remote from the cylinder-engaging edges thereof, the improvement which comprises, said connections being less flexible adjacent the abutting ends of the ring than in intermediate sections.

8. In a piston ring element of the non-bottoming type having an edge whose circumferential continuity is interrupted at a plurality of points intermediate the abutting ends thereof, the improvement which comprises, said ring being less flexible adjacent the abutting ends thereof than at a section intermediate said ends.

No references cited.